(12) United States Patent
Ginzburg et al.

(10) Patent No.: US 7,546,142 B2
(45) Date of Patent: Jun. 9, 2009

(54) DEVICE, SYSTEM AND METHOD OF COORDINATION AMONG WIRELESS TRANSCEIVERS

(75) Inventors: Boris Ginzburg, Haifa (IL); Camille C. Chen, Cupertino, CA (US); Gedon Rosner, Kfar Saba (IL)

(73) Assignee: Intel Corporation, Santa Clara, CA (US)

( * ) Notice: Subject to any disclaimer, the term of this patent is extended or adjusted under 35 U.S.C. 154(b) by 624 days.

(21) Appl. No.: 11/238,146

(22) Filed: Sep. 29, 2005

(65) Prior Publication Data

US 2007/0080781 A1   Apr. 12, 2007

(51) Int. Cl.
*H04M 1/00* (2006.01)
(52) U.S. Cl. ............... 455/552.1; 455/41.2; 455/556.1; 455/456.4; 370/338; 370/444
(58) Field of Classification Search ................. 455/450, 455/452.2, 41.1, 41.2, 448, 552.1, 88, 501, 455/556.1, 456.4; 370/338, 328, 347, 442, 370/444; 375/346, 135, 141, 349, 144, 148
See application file for complete search history.

(56) References Cited

U.S. PATENT DOCUMENTS

| 7,068,230 B2* | 6/2006 | Qi et al. ................ 343/702 |
| 2002/0032039 A1* | 3/2002 | Kimata .................. 455/556 |
| 2003/0060206 A1* | 3/2003 | Sointula et al. ......... 455/450 |
| 2005/0163070 A1* | 7/2005 | Farnham et al. ........ 370/328 |
| 2005/0215197 A1* | 9/2005 | Chen et al. ............. 455/41.2 |
| 2007/0047625 A1* | 3/2007 | Klomsdorf et al. ..... 375/141 |
| 2007/0165754 A1* | 7/2007 | Kiukkonen et al. .... 375/346 |
| 2007/0183383 A1* | 8/2007 | Bitran et al. ............ 370/338 |
| 2007/0224935 A1* | 9/2007 | Waxman ................ 455/41.2 |

FOREIGN PATENT DOCUMENTS

| WO | WO 01/24457 | 4/2001 |
| WO | WO 01/35578 | 5/2001 |

OTHER PUBLICATIONS

U.S. Appl. No. 11/263,778, filed Oct. 31, 2005, Chen et al.

\* cited by examiner

*Primary Examiner*—Sujatha Sharma
(74) *Attorney, Agent, or Firm*—Leason Ellis LLP/Shiloh Peleg & Co.

(57) ABSTRACT

Some embodiments of the invention provide devices, systems and methods of coordination among wireless transceivers. For example, an apparatus in accordance with an embodiment of the invention includes first and second wireless transceivers, wherein the first wireless transceiver is to enter a non-transmission mode for a pre-defined time period in response to an indication from the second wireless transceiver, and wherein one of the first and second wireless transceivers is to operate in a synchronous network and the other of the first and second wireless transceivers is to operate in a non-synchronous network.

24 Claims, 2 Drawing Sheets

DEVICE, SYSTEM AND METHOD OF COORDINATION AMONG WIRELESS TRANSCEIVERS

BACKGROUND OF THE INVENTION

In the field of wireless communications, a first wireless communication station may include multiple wireless transceivers, for example, a first transceiver able to operate in accordance with a first wireless communication standard or protocol, and a second transceiver able to operate in accordance with a second wireless communication standard or protocol.

The first transceiver may transmit a first wireless signal, thereby interfering with operations of the second transceiver, for example, with a scanning operation in which the second transceiver scans for an incoming wireless signal intended for reception, or with a receiving operation in which the second transceiver receives an incoming wireless signal.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

Figure 1:
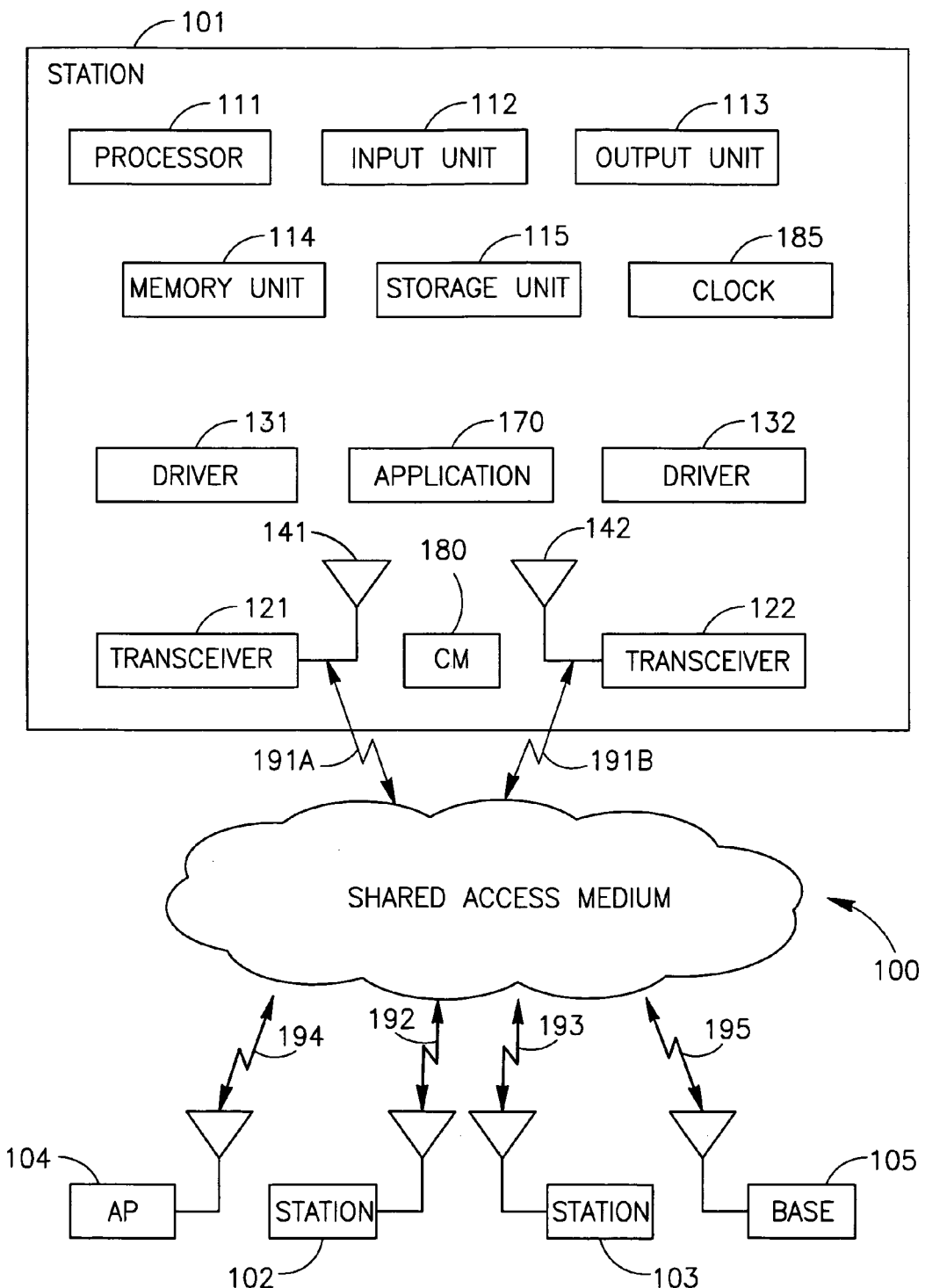
FIG. 1 is a schematic block diagram illustration of a wireless communication system including a wireless communication station utilizing wireless communication management in accordance with an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Embodiments of the invention may be used in a variety of applications. Some embodiments of the invention may be used in conjunction with many apparatuses and systems, for example, a transmitter, a receiver, a transceiver, a transmitter-receiver, a wireless communication station, a wireless communication device, a wireless Access Point (AP), a modem, a wireless modem, a personal computer, a desktop computer, a mobile computer, a laptop computer, a notebook computer, a Personal Digital Assistant (PDA) device, a tablet computer, a server computer, a network, a wireless network, a Local Area Network (LAN), a Wireless LAN (WLAN), devices and/or networks operating in accordance with existing IEEE 802.11, 802.11a, 802.11b, 802.11e, 802.11g, 802.11h, 802.11i, 802.11n, 802.16 standards and/or future versions of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), or the like. Embodiments of the invention may be used in various other apparatuses, devices, systems and/or networks.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, parameters, or the like. For example, "a plurality of stations" may include two or more stations.

Although embodiments of the invention are not limited in this regard, the terms "no-transmission mode" or "non-transmission mode" as used herein may include, for example, one or more modes in which a wireless transceiver does not transmit data and/or wireless signals, for example, an idle mode, a scanning mode, a reception mode, a "sleep" mode, a power saving mode, a standby mode, or the like.

FIG. 1 schematically illustrates a block diagram of a wireless communication system 100 including a wireless communication station 101 utilizing wireless communication management in accordance with an embodiment of the invention. System 100 may include one or more wireless communication stations, for example, stations 101, 102 and 103. System 100 may further include one or more wireless devices, for example, an Access Point (AP) 104 and a base station 105. Station 101, station 102, station 103, AP 104 and base station 105 may communicate using a shared access medium 190, for example, through wireless communication links 191A, 191B, 192, 193, 194 and 195, respectively.

In some embodiments, system 100 may be or may include one or more wireless communication networks, for example, an a-synchronic wireless network or an asynchronous wireless network, and/or a synchronic wireless network. For example, in one embodiment, station 102 and AP 104 may be able to operate in accordance with a first wireless communication standard, e.g., IEEE 802.11 standard, which may be a-synchronic, asynchronous, burstable, or the like; whereas station 103 and base station 105 may be able to operate in accordance with a second wireless communication standard, e.g., IEEE 802.16 standard, which may be synchronic, non-burstable, or the like. In some embodiments, for example, station 101 may be a hybrid wireless device, e.g., having multiple wireless transceivers, and may be able to operate in accordance with both the first and second wireless communication standards, e.g., synchronic and/or asynchronous, IEEE 802.16 standard and/or IEEE 802.11 standard, or the like.

Station 101 may include, for example, a processor 111, an input unit 112, an output unit 113, a memory unit 114, and a storage unit 115. Station 101 may further include multiple wireless transceivers, for example, transceivers 121 and 122, and one or more antennas, for example, antennas 141 and 142. Station 101 may further include other suitable hardware components and/or software components. In some embodiments, the components of station 101 may be enclosed in, for example, a common housing, packaging, or the like.

Processor 111 may include, for example, a Central Processing Unit (CPU), a Digital Signal Processor (DSP), a microprocessor, a controller, a chip, a microchip, an Integrated Circuit (IC), or any other suitable multi-purpose or specific processor or controller.

Input unit 112 may include, for example, a keyboard, a keypad, a mouse, a touch-pad, a microphone, or other suitable pointing device or input device. Output unit 113 may include, for example, a Cathode Ray Tube (CRT) monitor or display unit, a Liquid Crystal Display (LCD) monitor or display unit, a screen, a monitor, a speaker, or other suitable display unit or output device.

Memory unit 114 may include, for example, a Random Access Memory (RAM), a Read Only Memory (ROM), a Dynamic RAM (DRAM), a Synchronous DRAM (SD-RAM), a Flash memory, a volatile memory, a non-volatile memory, a cache memory, a buffer, a short term memory unit, a long term memory unit, or other suitable memory units or storage units. Storage unit 115 may include, for example, a hard disk drive, a floppy disk drive, a Compact Disk (CD) drive, a CD-ROM drive, or other suitable removable or non-removable storage units.

Transceiver 121 may include, may include, for example, a wireless Radio Frequency (RF) transceiver able to transmit and/or receive RF signals, e.g., through antenna 141. Transceiver 122 may include, may include, for example, a wireless RF transceiver able to transmit and/or receive RF signals, e.g., through antenna 142. In some embodiments, transceivers 121 and/or 122 may be implemented using a transmitter, a receiver, a transmitter-receiver, or one or more units able to perform separate or integrated functions of transmitting and/or receiving wireless communication signals, blocks, frames, transmission streams, packets, messages and/or data. In one embodiment, transceivers 121 and 122 may be implemented using a single component, e.g., a dual-transceiver card or modem, a multiple-transceiver card or modem, or the like; transceivers 121 and 122 may be otherwise collocated within a single modem, card, wireless communication unit, wireless communication component, or the like.

Antenna 141 and/or antenna 142 may include an internal and/or external RF antenna, for example, a dipole antenna, a monopole antenna, an omni-directional antenna, an end fed antenna, a circularly polarized antenna, a micro-strip antenna, a diversity antenna, or any other type of antenna suitable for transmitting and/or receiving wireless communication signals, blocks, frames, transmission streams, packets, messages and/or data.

In some embodiments, transceiver 121 may be able to operate in accordance with a first wireless communication standard or protocol, e.g., IEEE 802.11 standard, whereas transceiver 122 may be able to operate in accordance with a second wireless communication standard or protocol, e.g., IEEE 802.16 standard, or vice versa. In one embodiment, for example, transceiver 121 may communicate through link 191A with station 102 and/or AP 104 in accordance with IEEE 802.11 standard, whereas transceiver 122 may communicate through link 191B with station 103 and/or base station 105 in accordance with IEEE 802.16 standard, or vice versa. Other suitable standards or protocols may be used.

In some embodiments, transceiver 121 may be able to operate in accordance with a first wireless communication standard, e.g., IEEE 802.11 standard, which may be a-synchronic, asynchronous, burstable, or the like; whereas transceiver 122 may be able to operate in accordance with a second wireless communication standard, e.g., IEEE 802.16 standard, which may be synchronic, non-burstable, or the like; or vice versa Optionally, one or more communication drivers may be installed and/or utilized by station 101 or application 170, e.g., to drive or control transceivers 121 and 122. For example, a driver 131 may control transceiver 121, and a driver 132 may control transceiver 122.

In some embodiments, optionally, an application 170 may be executed by one or more components of station 101, for example, by processor 111. The application 170 may include, for example, a software application, an Operating System (OS), a communications application, or the like, and may be stored in memory unit 114 and/or storage unit 115.

Station 101 may further include a Communication Manager (CM) 180. In one embodiment, CM 180 may be implemented using a hardware component, for example, a controller, and/or using a software component. In one embodiment, for example, CM 180 may be implemented as a software component, e.g., included in driver 131 or operatively associated with driver 131. In another embodiment, for example, CM 180 may be implemented as a stand-alone software component, as part of driver 132, as part of application 170, as part of transceiver 121, as part of transceiver 122, as a component of an OS installed on station 101, or the like. CM 180 may, for example, create and/or transfer messages between drivers 131 and 132, and/or between transceivers 121 and 122. For example, CM 180 may transfer to driver 132 and/or transceiver 122 a no-transmission indication or request, e.g., originating from driver 131 and/or transceiver 121 or optionally created by CM 180; and CM 180 may transfer to driver 131 and/or transceiver 121 a response to the no-transmission indication or request, e.g., a response originating from driver 132 and/or transceiver 122 or optionally created by CM 180. CM 180 may otherwise facilitate communications between drivers 131 and 132, and/or between transceivers 121 and 122. In some embodiments, for example, communications between drivers 131 and 132, and/or communications between transceivers 121 and 122, e.g., communication of no-transmission indication or requests and their respective responses, or communication of priority information or packet priority information, may be handled by CM 180 and may utilize non-wireless links, e.g., using a hardware component, using a wired link, using a software component, or the like.

Figure 2:
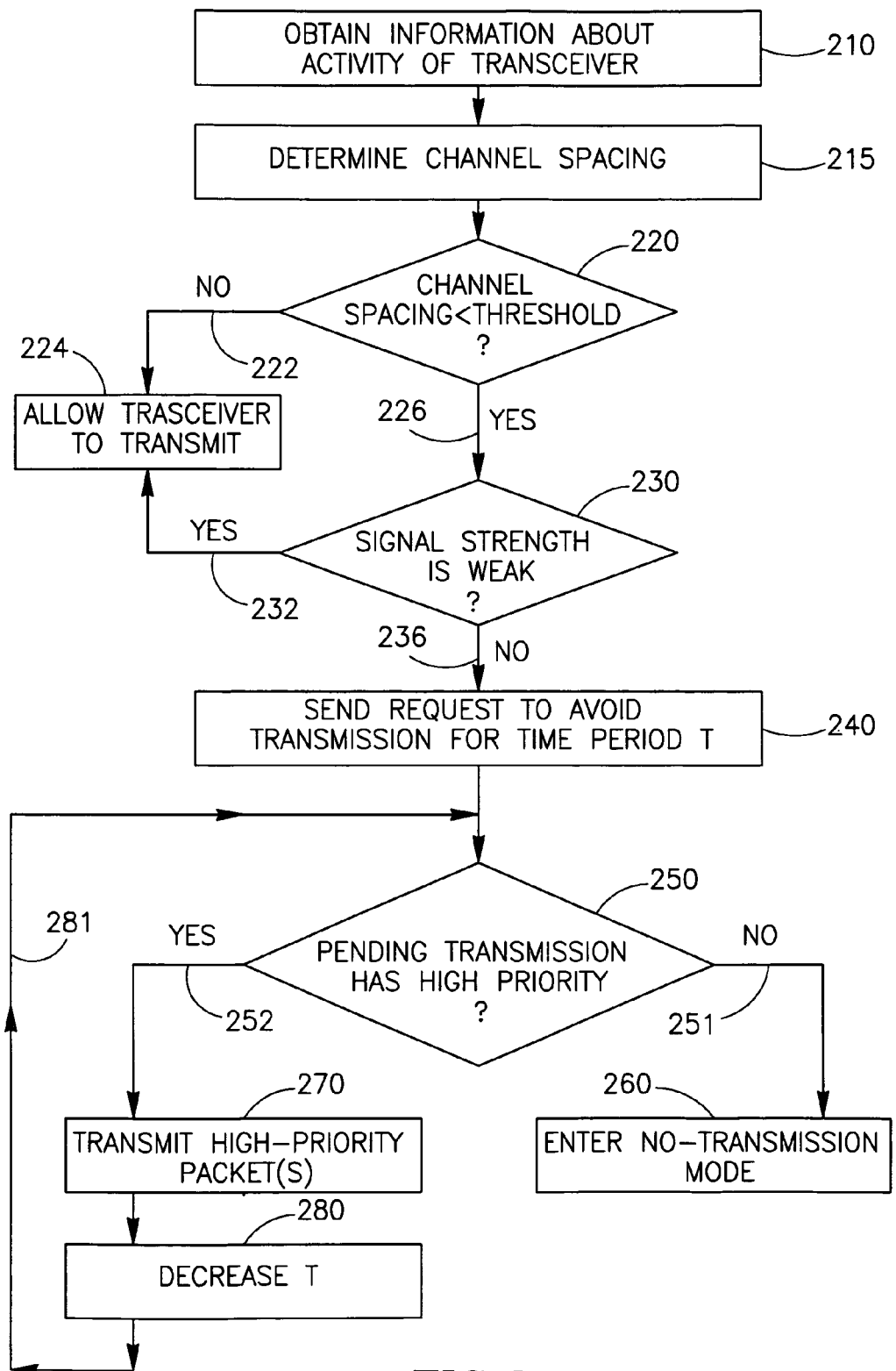
FIG. 2 is a schematic flow-chart of a method of wireless communication management in accordance with an embodiment of the invention.

In some embodiments, CM 180 may manage and/or control the communications of transceivers 121 and 122. For example, CM 180 may request transceiver 122 to avoid transmission for a pre-defined period of time, to maintain an idle status for a pre-defined period of time, or to perform only non-transmission operations, e.g., scanning and/or receiving, for a pre-defined period of time. Transceiver 122 may determine whether or not to perform the request, for example, based on a priority level associated with one or more pending tasks assigned for transceiver 122, based on a priority level associated with a packet or a stream of packets intended for transmission by transceiver 122, or based on other parameters or data. If the determination result is positive, then transceiver 122 may perform the request, e.g., by avoiding transmission for a pre-defined period of time, during which transceiver 121 may perform one or more operations, e.g., scanning operations and/or receiving operations. This may allow, for example, transceiver 121 to perform scanning and/or receiving operations during a time-period in which transceiver 122 may not perform transmission operations. In some embodiments, for example, CM 180 may utilize the method of FIG. 2 as discussed herein, or other suitable methods or operations Reference is made to FIG. 2, which is a schematic flow-chart of a method of wireless communication management in accordance with an embodiment of the invention. Operations of the method may be implemented, for example, by system 100 of FIG. 1, by station 101 of FIG. 1, by processor 111 of FIG. 1, by CM 180 of FIG. 1, and/or by other suitable stations, communication managers, applications, drivers, transceivers, units, devices, and/or systems.

As indicated at box 210, the method may include, for example, obtaining, e.g., by driver 131 of transceiver 121, information regarding the activity of transceiver 122 ("activity information"). The activity information may include, for example, information about a frequency or a frequency range used by transceiver 122, information about a bandwidth used by transceiver 122, information about strength of a signal transmitted by transceiver 122, information about an activity or non-activity of transceiver 122, or the like.

In one embodiment, for example, driver 131 or CM 180 may request driver 132 to provide the activity information regarding transceiver 122, and in response, driver 132 may send the activity information to driver 131 or CM 180. In another embodiment, for example, driver 131 or CM 180 may directly access driver 132 or transceiver 122 to read or otherwise obtain the activity information regarding transceiver 122. In yet another embodiment, for example, driver 132 may write activity information, e.g., periodically or upon request, into memory unit 114, and driver 131 or CM 180 may read the activity information from memory unit 114.

As indicated at box 215, the method may include, for example, determining a channel spacing between the frequencies or frequency ranges used by transceivers 121 and 122. For example, in one embodiment, transceiver 121 may use a first frequency, transceiver 122 may use a second frequency, and CM 180 or driver 131 may determine the channel spacing by calculating the difference between the first and second frequencies. In another embodiment, for example, transceiver 121 may use a first frequency range, transceiver 122 may use a second frequency range, and CM 180 or driver 131 may determine the channel spacing by calculating the difference between the center of the first frequency range and the center of the second frequency range.

As indicated at box 220, the method may include, for example, checking whether the channel spacing is smaller than a pre-defined threshold value, e.g., 40 MHz. If the checking result is negative (arrow 222), then the operations of boxes 230 and onward may be avoided; for example, transceiver 122 may be allowed to perform transmission operations, transceiver 122 may be allowed to resume a transmission mode or to enter a transmission mode, whereas transceiver 121 may be allowed to substantially simultaneously perform scanning and/or receiving operations (box 224), since the channel spacing may be sufficient to allow performance of such operations without mutual interference.

Conversely, as indicated by arrow 226, if the checking result is positive, then the method may include, for example, checking whether the strength of the signal transmitted by transceiver 122 is relatively weak or low (box 230), e.g., if the power level of the signal is relatively low (e.g., smaller than a threshold value), or checking otherwise whether the signal does not interfere with scanning or reception operations of another transceiver. If the checking result is positive (arrow 232), then the operations of boxes 240 and onward may be avoided; for example, transceiver 122 may be allowed to perform transmission operations, or may maintain transmission operations, whereas transceiver 121 may substantially simultaneously perform scanning and/or receiving operations (box 224). This may be performed, for example, since the relatively weak signal transmitted by transceiver 122 may not interfere or may not significantly interfere with the scanning and/or receiving operations of transceiver 121.

Conversely, as indicated by arrow 236, if the checking result is negative, then the method may proceed with the operations of box 240 and onward. For example, as discussed herein, the transceiver may enter a non-transmission mode if a value of a parameter related to a power level of a wireless signal transmitted by the transceiver is larger than a threshold value, i.e., if the wireless signal is relatively strong.

As indicated at box 240, the method may include, for example, sending a request to avoid transmission or to enter no-transmission mode for a pre-defined period of time ("no-transmission request" or "transmission avoidance request"), or other suitable indication or message. For example, driver 131 may send to driver 132 a request that transceiver 122 avoid transmission, or maintain non-transmission status, for a pre-defined period of time, denoted T, e.g., twenty milliseconds. In another embodiment, for example, driver 131 may send alternate and/or additional information, for example, information about the operational status of transceiver 121, information about priority of one or more packets pending transmission by transceiver 121, or the like.

In response to the request, driver 132 may check one or more priority parameters or activity parameters associated with tasks pending with transceiver 122. For example, as indicated at box 250, driver 132 may check whether a pending transmission assigned to transceiver 122 is associated has high priority, a relatively high priority, or an urgent priority. This may include, for example, checking whether a priority value associated with the pending transmission, or associated with one or more packets intended for transmission, is higher than a pre-defined threshold value.

As indicated by arrow 251, if the checking result is negative, i.e., if a pending transmission task of transceiver 122 does not have a high priority, then, as indicated by box 260, the method may include avoiding transmission or enter non-transmission mode for the pre-defined period of time T. For example, transceiver 122 may avoid transmission for twenty milliseconds, and/or may enter and maintain non-transmission mode for twenty milliseconds. In one embodiment, during the time period T, transceiver 122 may remain idle. In another embodiment, during the time period T, transceiver 122 may perform receiving and/or scanning operations, may receive incoming wireless signals, may receive data, may scan for incoming wireless communication signals intended for reception, or the like.

Optionally, driver 132 may notify driver 131 that the request for no-transmission is accepted by transceiver 122 for the time period T; accordingly, driver 131 may control transceiver 121 to perform scanning and/or receiving operations during that time period T. In some embodiments, optionally, driver 132 may abort or terminate a no-transmission period, for example, if an urgent or high-priority transmission is assigned to transceiver 122 during the no-transmission period T. In one embodiment, for example, in response to a no-transmission request, transceiver 122 may avoid transmission, but may resume or commence transmitting if a high-priority packet is pending transmission by transceiver 122.

Conversely, as indicated by arrow 252, if the checking result is positive, i.e., if a pending transmission task of transceiver 122 has a high priority, then, as indicated at box 270, the method may include performing the pending transmission task. For example, transceiver 122 may transmit a high-priority transmission or packet awaiting transmission, and may not accept the request of driver 131 to avoid transmission. Optionally, upon transmitting a high-priority packet by transceiver 122, driver 132 may re-check whether transceiver 122 may accept the no-transmission request. For example, in some embodiments, as indicated at box 280, driver 132 may decrease the requested no-transmission time period T by the time that elapsed by transmitting the high-priority packet by transmitter 122; and, as indicated by arrow 281, the method may proceed with the operations of box 250 and onward, using the updated (e.g., decreased) time period T in which no-transmission is requested.

In some embodiments, optionally, driver 131 and/or driver 132 may modify or maintain an activity mode or operational status of transceivers 121 and/or 122, respectively. For example, if the no-transmission request is accepted by driver 132, then driver 132 may modify the operational status of transceiver 122, e.g., from transmission mode to no-transmission mode, to idle mode, to receiving mode, to scanning mode, or the like; whereas driver 131 may modify the operational status of transceiver 121, e.g., to scanning mode, to receiving mode, or the like. Conversely, if the no-transmission request is not accepted by driver 132, then driver 132 may maintain the operational status of transceiver 122, or may set the operational status of transceiver 122 to transmission mode, e.g., to transmit a high-priority packet; whereas driver 131 may, for example, perform transmission operations, may delay a scanning or receiving operations, or the like.

In some embodiments, the no-transmission request may be implemented using, or included in, a Channel Access Priority (CAP) request, whereas the response may be implemented using, or included in, a CAP response. The no-transmission request may be sent once, multiple times, periodically, or the like. In some embodiments, the no-transmission request may include, for example, a time period T in which transmission avoidance in requested; in one embodiment, the time period T may be indicated using real time, absolute time, relative time, or one or more time points measured by a clock 185 of station 101 ("system time"), e.g., using a first time point indicating the beginning of time period T and a second time point indicating the ending of time period T.

In some embodiments, the no-transmission request may be sent by driver 131 in advance, for example, at least ten milliseconds before commencement of the requested no-transmission period. This may allow, for example, driver 132 to process the request and to send the response to driver 131 prior to commencement of the requested no-transmission period.

In one embodiment, the in response to a no-transmission request sent by driver 131, driver 132 may send a response indicating that the no-transmission request is accepted. In another embodiment, the response may indicate that the no-transmission request is rejected. In yet another embodiment, the response may indicate that the no-transmission request is partially accepted, for example, that the no-transmission period may begin after the requested beginning time, or that the no-transmission period may end prior to the requested ending time, or that the duration of the no-transmission period may be shorter than the requested duration. In still another embodiment, the response may indicate an alternate no-transmission period suggested by driver 132; for example, in response to a no-transmission request relating to a first time period beginning at a first time point, driver 132 may send a response indicating that transceiver 122 may avoid transmission for a second, different time period and/or beginning at a second, different, time point.

In one embodiment, no-transmission requests and/or responses may be exchanged between driver 131 and driver 132, or vice versa. In another embodiment, no-transmission requests and/or responses may be exchanged between transceiver 121 and transceiver 122, or vice versa. In yet another embodiment, no-transmission requests and/or responses may be exchanged between driver 131 and transceiver 122, or vice versa; and/or between driver 132 and transceiver 121, or vice versa. In still another embodiment, no-transmission requests and/or responses may be managed by, or routed through, application 170, CM 180, a ring-0 application, a kernel layer application, a ring-3 application, a user layer application, an Operating System (OS) component, an applet, or the like.

In some embodiments, CM 180 or application 170 may trigger a no-transmission request, for example, if transceiver 122 communicates using a weak or relatively weak wireless signal. This may indicate, for example, that the wireless communication link used by transceiver 122 may be relatively non-reliable, may disconnect, or may have a relatively low throughput, and may thereby trigger CM 180 or application 170 to initiate a search for a stronger wireless communication link, e.g., utilizing transceiver 121 which may need to perform scanning operations and/or receiving operations. Therefore, a no-transmission request may be sent to driver 132 and/or transceiver 122, to allow transceiver 121 to scan for a wireless signal, for a stronger wireless signal, for a more reliable wireless signal, for a wireless signal having higher throughput, or the like. This may allow, for example, application 170 to utilize a "make before break" communication scheme, such that a stronger or more reliable wireless link is detected and established by transceiver 121 prior to termination of a weaker or less reliable wireless link used by transceiver 122.

In one embodiment, for example, transceiver 121 may be able to operate in accordance with IEEE 802.11 standard, whereas transceiver 122 may be able to operate in accordance with IEEE 802.16 standard. Driver 131 of transceiver 121 may send a no-transmission request to driver 132 of transceiver 122. In response, transceiver 122 may avoid transmission, as requested. For example, in one embodiment, transceiver 122 may perform iterative scanning, or may perform continuous or substantially continuous scanning. In another embodiment, transceiver 122 may commence a "sleep" period, may utilize a relatively long-term negotiation period (e.g., approximately 35 milliseconds) which may be repeated if no high-priority transmissions are pending, may utilize a reoccurring "sleep" period (e.g., similar to some TDMA implementations), may utilize a single-duration "sleep" period for broadcast operations and/or multicast operations, or the like. In yet another embodiment, transceiver 122 may go into idle mode, or may remain idle status; this may be performed, for example, without a HandOff (HO) procedure, utilizing a HO procedure, using an exit latency procedure or HO, or the like.

In another embodiment, for example, transceiver 121 may be able to operate in accordance with IEEE standard 802.16, whereas transceiver 122 may be able to operate in accordance with IEEE standard 802.11. Driver 131 of transceiver 121 may send a no-transmission request to driver 132 of transceiver 122. In response, transceiver 122 may avoid transmission, as requested; optionally, this may be performed by transceiver 122 substantially without packet loss. For example, in one embodiment, transceiver 122 may utilize a no-transmission period around a time point at which a wireless beacon signal is expected, e.g., approximately ten milliseconds; accordingly, driver 132 of transceiver 122 may notify driver 131 of transceiver 121 that a no-transmission period of approximately ten milliseconds may commence at a certain time point, e.g., prior to or upon the expected transmission of a wireless beacon signal. In another embodiment, transceiver 122 may avoid transmission as requested, and/or may perform scanning operations (e.g., instead of transmission operations) during the requested no-transmission period. In yet another embodiment, transceiver 122 may avoid transmission as requested, and/or may optionally transmit a notification to AP 104 that transceiver 122 goes into a "power save" mode, e.g., to optionally block further reception of wireless signals from AP 104 and/or to avoid transmission of acknowledgement ("ACK") packets, frames or messages by transceiver 122.

In some embodiments, optionally, in response to a no-transmission request by driver 131 and/or transceiver 132, the transceiver 122 may cause one or more other devices of system 100 to avoid transmission, or may cause one or more devices of a BSS to avoid transmission, e.g., all types of transmissions or transmissions directed to transceiver 122. This may be performed, for example, by transmitting a notification by transceiver 122, indicating that transceiver 122 goes into a "power save" mode or into another mode which may not be fully operationally, or by transmitting or broadcasting another notification or message indicating that transceiver 122 may not be able to communicate for a pre-defined period of time or until another notification or message is transmitted by transceiver 122. This may result in, for example, reducing or eliminating transmissions from other wireless devices of system 100 to transceiver 122, thereby reducing or eliminating transmission of acknowledgement ("ACK") packets, frames or messages by transceiver 122, thus improving the no-transmission result to further allow improved scanning or reception operations by transceiver 121.

In still another embodiment, for example, in order to switch between activity modes and/or to avoid transmission, transceiver 122 may utilize an Automatic Power Save Delivery (APSD) functionality. In another embodiment, for example, in order to switch between activity modes and/or to avoid transmission, transceiver 122 may utilize a Request to Send/ Clear to Send (RTS/CTS) mechanism, e.g., a CTS-to-self mechanism to avoid or delay transmission for the requested no-transmission period, for example, in a part of a Basic Service Set (BSS) or in substantially an entire BSS associated with station 101. In yet another embodiment, to avoid transmission, transceiver 122 may utilize a Network Allocation Vector (NAV) protection mechanism, for example, using null data frame transmission, e.g., to avoid transmission in a BSS for the requested no-transmission period; station 101 may optionally utilize clock 185 and/or other suitable internal or external clock, counter or timer, for example, to delay or defer transmission until the requested no-transmission period elapses. In still another embodiment, transceiver 122 may utilize a "passive" or "passive+" scanning or monitoring mechanism, e.g., a scanning mode that detects energy before sending a probe request frame to AP 104 which may operate in "stealth" mode, for example, if the AP 104 does not broadcast its Service Set Identifier (SSID). In another embodiment, transceiver 122 may utilize a scheduled quiet period or a scheduled no-transmission period, optionally using other suitable mechanisms to delay or defer transmission operations.

Some embodiments of the invention may, for example, provide a co-existence scheme which may be used, for example, by transceivers 121 and 122 which may substantially simultaneously operate, for example, in accordance with IEEE 802.11 and 802.16 standards, respectively, or vice versa. In some embodiments, the coordination between transceivers 121 and 122 may, for example, increase Quality of Service (QoS), improve connectivity of a wireless station, and/or improve user experience. For example, some embodiments may prevent transceiver 122 from transmitting, e.g., data or low-priority data, for example, "background" data or "best effort" data, if transceiver 121 is required to receive, e.g., data or high-priority data, for example, voice data.

In some embodiments, transceivers 121 and 122 may operate and/or function substantially in parallel, and may not utilize a TDMA scheme. For example, in one embodiment, transceiver 122 may continue to operate, but may modify its mode of operation and may not cease to operate, during a pre-defined time period in order to allow transceiver 121 to perform other operations.

In some embodiments, optionally, a no-transmission request sent by transceiver 121 or driver 131, may include data or parameters indicating a priority associated with one or more tasks pending with transceiver 121. For example, the no-transmission request may include a parameter indicating that transceiver 121 is required to urgently perform scanning and/or receiving operations, or that transceiver 121 lost a certain number of incoming data packets and is required to improve its reception. Upon receiving the no-transmission request, transceiver 122 or driver 132 may take into account such information, e.g., information about priority or urgency of one or more tasks pending with transceiver 121. For example, in one embodiment, transceiver 122 may accept a no-transmission request if the priority of tasks pending with transceiver 121 is higher than the priority of tasks pending with transceiver 122, if the priority of tasks pending with transceiver 121 is higher than a pre-defined threshold value, or using other conditions or criteria, e.g., which may be set by application 170 and/or CM 180. Messages, requests and responses which may be exchanged between drivers 131 and 132, and/or between transceivers 121 and 122, may include various other information or parameters, need not be limited to a channel number or a channel identifier, may include priority information, or the like.

Although FIG. 1 shows, for demonstrative purposes, two wireless transceivers 121 and 122, other number of transceivers may be used and may be included in station 101. For example, some embodiments of the invention may coordinate activities of three transceivers, four transceivers, or other suitable number of transceivers.

Although portions of the discussion herein may relate, for demonstrative purposes, to a first transceiver sending a no-transmission request to a second transceiver which may accept or reject the request, embodiments of the invention are not limited in this regard. For example, in one embodiment, the second transceiver may send information (e.g., priority-related information) to the first transceiver, and the first transceiver may determine whether the second transceiver is required to enter non-transmission mode, and may command the second transmission to enter non-transmission mode. In another embodiment, for example, the first transceiver and/or the second transceiver may send information (e.g., priority-related information) to another component (e.g., driver 131, driver 132, CM 180, application 170, processor 111, or the like) which may determine whether the second transceiver is required to enter non-transmission mode, and may command the second transmission to enter non-transmission mode. Other suitable configurations may be used.

Other suitable operations or sets of operations may be used in accordance with embodiments of the invention, for example, to prevent transmission by a first transceiver of a wireless communication station for a pre-defined time period in response to a request of a second transceiver of the wireless communication station. In one embodiment, for example, the method may include preventing transmission by a first transceiver of a wireless communication station for a pre-defined time period in response to a request of a second transceiver of said wireless communication station. For example, transmission may be prevented if a channel spacing between a first frequency used by said first transceiver and a second frequency used by said second transceiver is smaller than a threshold value; if a value of a parameter related to a power level of a wireless signal transmitted by the first transceiver is larger than a threshold value; if a low priority packet is pending transmission by the first transceiver; if a first priority associated with a first packet pending transmission by the first transceiver is lower than a second priority associated with a second packet pending transmission by the second transceiver; or the like. Transmission mode may be resumed, for example, by the first transceiver if a high priority packet is pending transmission by the first transceiver.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

Some embodiments of the invention may be implemented, for example, using a machine-readable medium or article which may store an instruction or a set of instructions that, if executed by a machine, for example, by system 100 of FIG. 1, by station 101 of FIG. 1, by processor 111 of FIG. 1, or by other suitable machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit (e.g., memory unit 114 or storage unit 115), memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
    first and second wireless transceivers, wherein the first wireless transceiver is to decrease a pre-defined time period by a time period of transmission of a high priority packet prior to entering a non-transmission mode, to enter the non-transmission mode for the pre-defined time period in response to an indication from the second wireless transceiver, and wherein one of the first and second wireless transceivers is to operate in a synchronous network and the other of the first and second wireless transceivers is to operate in a non-synchronous network.

2. The apparatus of claim 1, wherein the indication is a request to enter the non-transmission mode.

3. The apparatus of claim 1, further comprising:
    a communication manager to transfer said indication from said second wireless transceiver to said first wireless transceiver.

4. The apparatus of claim 1, wherein said first wireless transceiver is to enter the non-transmission mode if a channel spacing between a first frequency used by said first wireless transceiver and a second frequency used by said second wireless transceiver is smaller than a threshold value.

5. The apparatus of claim 1, wherein the first wireless transceiver is to enter the non-transmission mode if a value of a parameter related to a power level of a wireless signal transmitted by the first wireless transceiver is larger than a threshold value.

6. The apparatus of claim 1, wherein the first wireless transceiver is to enter the non-transmission mode if a low priority packet is pending transmission by the first wireless transceiver.

7. The apparatus of claim 1, wherein the first wireless transceiver is to enter the non-transmission mode if a first priority associated with a first packet pending transmission by the first wireless transceiver is lower than a second priority associated with a second packet pending transmission by the second wireless transceiver.

8. The apparatus of claim 1, wherein the first wireless transceiver is to resume a transmission mode if a high priority packet is pending transmission by the first wireless transceiver.

9. The apparatus of claim 1, further comprising:
    a first driver to control the first wireless transceiver; and
    a second driver to control the second wireless transceiver, wherein said indication is sent from said second driver to said first driver.

10. The apparatus of claim 9, wherein the first driver is to send a response to the second driver indicating whether the first wireless transceiver enters the non-transmission mode.

11. A wireless communication system comprising:
a wireless communication station comprising:
a dipole antenna to send and receive wireless communication signals; and first and second transceivers,
wherein the first transceiver is to decrease a pre-defined time period by a time period of transmission of a high priority packet prior to entering a non-transmission mode and to enter the non-transmission mode for the pre-defined time period in response to an indication from the second transceiver,
and wherein one of the first and second wireless transceivers is to operate in a synchronous network and the other of the first and second wireless transceivers is to operate in a non-synchronous network.

12. The wireless communication system of claim 11, wherein the indication is a request to enter the non-transmission mode.

13. The wireless communication system of claim 11, wherein said first transceiver is to enter the non-transmission mode if a channel spacing between a first frequency used by said first transceiver and a second frequency used by said second transceiver is smaller than a threshold value.

14. The wireless communication system of claim 11, wherein the first transceiver is to enter the non-transmission mode if a value of a parameter related to a power level of a wireless signal transmitted by the first transceiver is larger than a threshold value.

15. The wireless communication system of claim 11, wherein the first transceiver is to enter the non-transmission mode if a low priority packet is pending transmission by the first transceiver.

16. The wireless communication system of claim 11, wherein the first transceiver is to enter the non-transmission mode if a first priority associated with a first packet pending transmission by the first transceiver is lower than a second priority associated with a second packet pending transmission by the second transceiver.

17. The wireless communication system of claim 11, wherein the first transceiver is to resume a transmission mode if a high priority packet is pending transmission by the first transceiver.

18. A method comprising:
preventing transmission by a first transceiver of a wireless communication station for a pre-defined time period in response to an indication from a second transceiver of said wireless communication station, wherein one of the first and second wireless transceivers is to operate in a synchronous network and the other of the first and second wireless transceivers is to operate in a non-synchronous network; and
prior to preventing transmission, decreasing the pre-defined time period by a time period of transmission of a high priority packet.

19. The method of claim 18, wherein preventing transmission in response to an indication comprises:
preventing transmission in response to a request to enter a non-transmission mode.

20. The method of claim 18, wherein preventing transmission comprises:
preventing transmission if a channel spacing between a first frequency used by said first transceiver and a second frequency used by said second transceiver is smaller than a threshold value.

21. The method of claim 18, wherein preventing transmission comprises:
preventing transmission if a value of a parameter related to a power level of a wireless signal transmitted by the first transceiver is larger than a threshold value.

22. The method of claim 18, wherein preventing transmission comprises:
preventing transmission if a low priority packet is pending transmission by the first transceiver.

23. The method of claim 18, wherein preventing transmission comprises:
preventing transmission if a first priority associated with a first packet pending transmission by the first transceiver is lower than a second priority associated with a second packet pending transmission by the second transceiver.

24. The method of claim 18, further comprising:
resuming a transmission mode of the first transceiver if a high priority packet is pending transmission by the first transceiver.

* * * * *